United States Patent
Myers et al.

(10) Patent No.: US 7,360,951 B2
(45) Date of Patent: Apr. 22, 2008

(54) DETACHABLE HALF SHAFT ASSEMBLY OF A VEHICLE WHEEL END

(75) Inventors: Douglas C. Myers, Canton, MI (US); Paul E. Beshears, Jr., Plymouth, MI (US); Aaron A. Horne, Sr., Lathrup Village, MI (US); James M. Story, Saline, MI (US); Gunnar Ross, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 22 days.

(21) Appl. No.: 10/766,384

(22) Filed: Jan. 28, 2004

(65) Prior Publication Data
US 2005/0162001 A1    Jul. 28, 2005

(51) Int. Cl.
*F16C 43/00* (2006.01)
*B21D 53/10* (2006.01)
*B60B 37/00* (2006.01)
*B60K 17/30* (2006.01)

(52) U.S. Cl. .................. 384/537; 29/898.09; 301/126; 180/258

(58) Field of Classification Search ............. 301/105.1, 301/124.1, 126, 131; 384/537, 539, 585, 384/544, 589; 29/434, 898.062, 898.07, 29/898.09, 407.08; 180/258–259, 253, 256
See application file for complete search history.

(56) References Cited

U.S. PATENT DOCUMENTS

| 4,493,388 A | * | 1/1985 | Welschof et al. ........... 384/544 |
| 5,061,090 A | | 10/1991 | Kriaski et al. |
| 5,430,926 A | | 7/1995 | Hartford |
| 5,486,053 A | * | 1/1996 | Beagley et al. ............. 384/544 |
| 5,911,458 A | | 6/1999 | Bywalez et al. |
| 6,112,411 A | | 9/2000 | Rutter |
| 6,158,124 A | | 12/2000 | Austin |
| 6,227,624 B1 | | 5/2001 | Wiacek et al. |
| 6,364,426 B1 | | 4/2002 | Horne et al. |
| 6,450,585 B1 | * | 9/2002 | Kochsiek ................. 301/124.1 |
| 6,532,666 B1 | | 3/2003 | Denny, Jr. et al. |
| 6,736,418 B2 | * | 5/2004 | Wang .................... 280/93.512 |

(Continued)

FOREIGN PATENT DOCUMENTS

DE    100 54 421 A1    11/2000

*Primary Examiner*—Jason R. Bellinger
(74) *Attorney, Agent, or Firm*—Brinks Hofer Gilson & Lione

(57) ABSTRACT

The present invention involves a detachable half shaft assembly of a vehicle wheel end and has a shaft bell and a disc rotor. The detachable half shaft comprises a preloaded bearing assembly and a detachable body receiving the preloaded bearing assembly. The preloaded bearing assembly has an inner surface formed through inboard and outboard ends thereof. The detachable body has an inboard interface at an inboard end and an outboard interface at an outboard end. The inboard interface is configured for connecting to the shaft bell and the outboard is configured or connecting to the disc rotor. The detachable body has a bearing receiving portion defined by the stepped boss and a roll formed base. The bearing receiving portion radially receives the inner surface of the preloaded bearing assembly. The stepped boss and the roll formed base engages the bearing assembly and the inboard and outboard ends to maintain the preload thereon when the detachable half shaft assembly is detached from the shaft bell or the disc rotor.

3 Claims, 4 Drawing Sheets

U.S. PATENT DOCUMENTS

2003/0048967 A1* 3/2003 Sahashi et al. ............. 384/544
2003/0179969 A1* 9/2003 Baudry ...................... 384/537
2004/0169415 A1* 9/2004 Kapaan et al. ........... 301/105.1
2005/0063628 A1* 3/2005 Wang et al. ................ 384/544

* cited by examiner

DETACHABLE HALF SHAFT ASSEMBLY OF A VEHICLE WHEEL END

BACKGROUND OF THE INVENTION

The present invention relates to a detachable half shaft assembly of a vehicle wheel end.

Wheel ends and bearing assemblies for motor vehicles are known and have been widely used in the automotive industry for many years. A wheel end of a vehicle may include a half shaft, a disc rotor cooperating with the half shaft, a preloaded bearing assembly disposed about the half shaft and mounted to a steering knuckle by means of fasteners or interference fittings, and a shaft bell cooperating with the half shaft opposite the disc rotor. A preloaded bearing assembly may include an inner race having raceways formed thereon and an outer race having raceways formed thereon wherein the inner and outer races cooperate with each other to house ball bearings or taper roller bearings within the raceways.

Although current vehicle wheel end assembly designs are adequate, there is a challenge to manufacture wheel ends that are serviceable while maintaining preload of the bearing assembly. For example, many of the current designs of wheel ends include a preloaded bearing assembly which, upon service of the wheel end, requires disassembly of the preloaded bearing assembly. As a result, the preload of the bearing assembly is dissipated from the wheel end, requiring additional time for preload of the bearing assembly upon re-assembly.

Thus, there is a need to provide a vehicle wheel end assembly configured to allow for a more time efficient serviceability thereof.

BRIEF SUMMARY OF THE INVENTION

One aspect of the present invention provides a detachable half shaft assembly of a vehicle wheel end which is configured to allow for a more time efficient serviceability of the vehicle wheel end.

In one embodiment, the present invention is a detachable half shaft assembly of a vehicle wheel end having a shaft bell and a disc rotor. The detachable half shaft comprises a preloaded bearing assembly and a detachable body for receiving the preloaded bearing assembly. The preloaded bearing assembly has an inner surface formed through inboard and outboard ends thereof. The detachable body has an inboard interface at an inboard end and an outboard interface at an outboard end. The inboard interface is configured to connect to the shaft bell and the outboard interface is configured to connect to the disc rotor. The detachable body has a bearing receiving portion defined by a stepped boss and a roll formed face. The bearing receiving portion radially receives the inner surface of the preloaded bearing assembly. The stepped boss and the roll formed face engages the bearing assembly at the inboard and outboard ends to maintain the preload thereon when the detachable half shaft assembly is detached from the shaft bell or the disc rotor.

In another embodiment, the preloaded bearing assembly of the detachable half shaft assembly comprises an outer race and inner races. The outer race includes an inner wall formed therethrough having an inboard outer raceway and an outboard outer raceway formed thereon. The inner races include an outboard inner race and an inboard inner race. The outboard inner race is disposed adjacent the outboard end of the detachable body. The outboard inner race has a first raceway formed thereon and is configured to cooperate with the outboard outer raceway of the outer race to house bearings. The outboard inner race has an outboard inner surface.

The inboard inner race is disposed adjacent the inboard end of the detachable body. The inboard inner race has a second raceway formed thereon and is configured to cooperate with the inboard outer raceway of the outer race to house bearings. The inboard inner race has an inboard inner surface.

Further objects, features and advantages of the invention will become apparent from consideration of the following description and the appended claims when taken in connection with the accompanying drawings

DETAILED DESCRIPTION OF THE INVENTION

Figure 1:
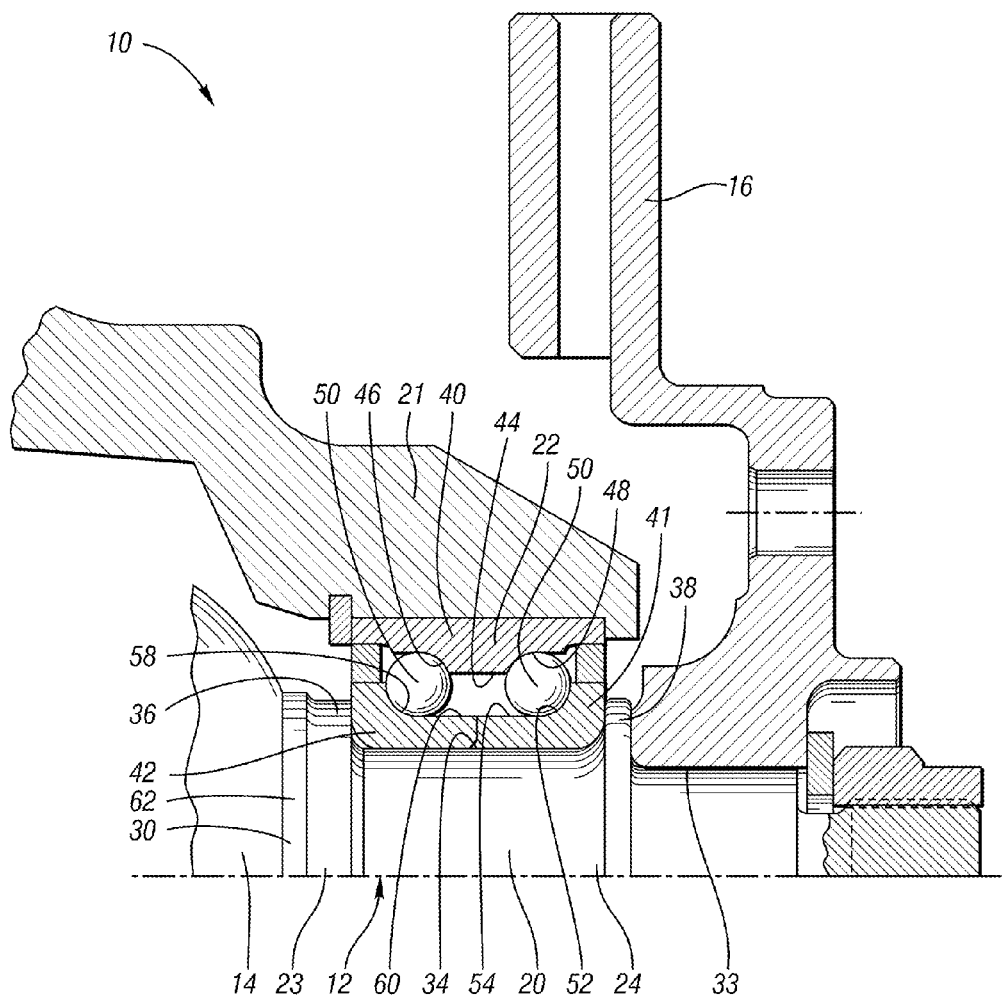
FIG. 1 is a side cross-sectional view of a vehicle wheel end assembly having a detachable half shaft assembly in accordance with one embodiment of the present invention.

FIG. 1 illustrates one embodiment of a vehicle wheel end assembly 10 including a detachable half shaft assembly 12, a shaft bell 14 connected to the detachable half shaft assembly 12, and a disc rotor 16 connected to the detachable half shaft assembly 12 opposite the shaft bell 14. As shown, the detachable half shaft assembly 12 includes a detachable body 20 and a preloaded bearing assembly 22 preloaded about the detachable body 20 to be attached to knuckle 21. The detachable body 20 has an inboard end 23 and an outboard end 24. The shaft bell 14 attaches to the detachable body 20 at the inboard end 23 defining an inboard interface 30. The disc rotor 16 attaches to the detachable body 20 at the outboard end 24 defining an outboard interface 33.

As shown, the detachable body 20 has a bearing receiving portion 34 formed thereon. In this embodiment, the bearing receiving portion 34 is formed by a stepped boss 36 formed adjacent the inboard end 23 and a roll formed face 38 formed adjacent the outboard end 24. In this embodiment, the roll formed face 38 has been roll formed during the manufacture of the detachable body 20 defining the bearing receiving portion 34. It is to be understood that the roll formed face may be roll formed by any suitable means known in the art. The bearing receiving portion 34 is formed to receive the bearing assembly 22 about the detachable body 20. During roll forming of the roll formed face 38, a bearing assembly is preloaded about the detachable body 20 thereby. The preload of the preloaded bearing assembly 22 is maintained by the continuous engagement with the stepped boss 36 and the roll formed face 38, even during service of the wheel end.

In one embodiment, FIG. 1 illustrates the preloaded bearing assembly 22 having an outer race 40, an outboard inner race 41, and an inboard inner race 42, wherein the inner races 41 and 42 cooperate with the outer race 40 for rotational movement of the disc rotor 16. The outer race 40 is disposed about the bearing receiving portion 34 between stepped boss 36 and roll formed face 38. As shown, the outer race 40 includes an inner wall 44 formed therethrough. The inner wall 44 has an inboard outer raceway 46 and an outboard outer raceway 48 formed thereon.

In this embodiment, the outboard inner race 41 cooperates with the inner wall 44 of the outer race 40. The outboard inner race 41 is disposed radially between the outer race 40 and the detachable body 20 and is located adjacent the outboard end 24 of the detachable body. The outboard inner race 41 has a first raceway 52 formed thereon and is configured to cooperate with the outboard outer raceway 48 of the outer race 40 to house bearings 50. The outboard inner race 41 has an outboard inner surface 54.

The inboard inner race 42 cooperates with the inner wall 44 of the outer race 40. The inboard inner race 42 is disposed radially between the outer race 40 and the detachable body 20 and is located adjacent the inboard end 23 of the detachable body 20. The inboard inner race 42 has a second raceway 58 formed thereon and is configured to cooperate with the inboard outer raceway 46 of the outer race 40 to house bearings 50. The inboard inner race 42 has an inboard inner surface 60.

Figure 4:
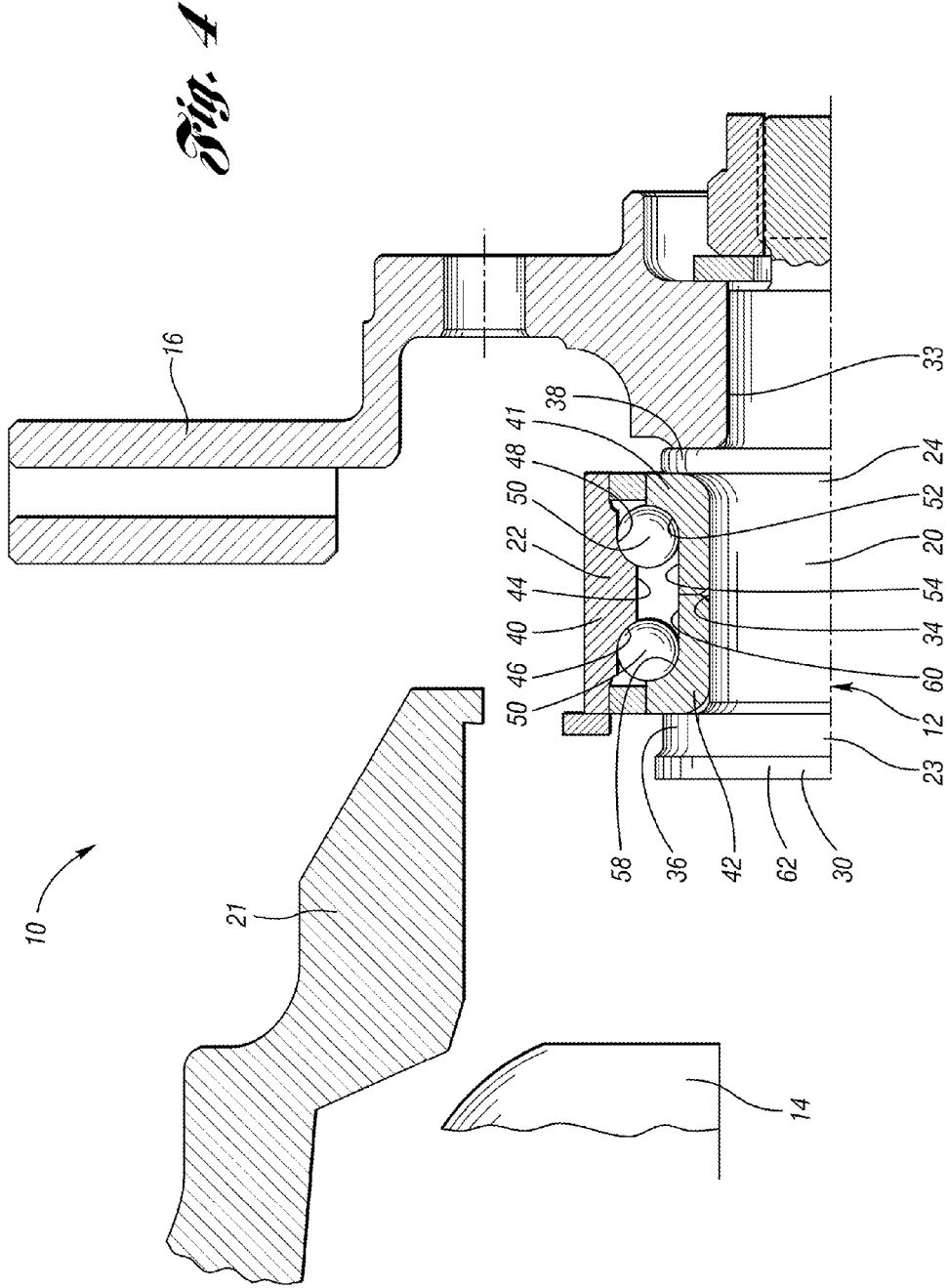
FIG. 4 is a side cross sectional view of the vehicle wheel end assembly of FIG. 1, the detachable half shaft assembly being detached.

As shown, the bearing receiving portion 34 radially receives the inboard inner surface 60 and the outboard inner surface 54. The stepped boss 36 and the roll formed face 38 engages the preloaded bearing assembly 22 to maintain the preload thereon when the detachable half shaft assembly 12 is detached from the shaft bell 14 or the disc rotor 16. For example, with reference to FIG. 4, the detachable half shaft assembly 12 is detached from the shaft bell 14. The roll formed face 38 may be roll formed by any suitable means to create a preload on the bearing assembly.

As shown in FIG. 1, the stepped boss 36 of the detachable body 20 is formed at the inboard end 23. However, it is to be noted that the stepped boss of the detachable body may be formed at one of the inboard end or the outboard end of the detachable body. Moreover, the roll formed face 38 of the detachable body 20 is formed adjacent the outboard end 24. However, it is to be understood that the roll formed face may be formed adjacent the other of the inboard end or the outboard end opposite the stepped boss.

As shown, the inboard interface 30 of the detachable body 20 is a polygon surface or interface 62, e.g., an 18-sided polygon surface. Moreover, in this embodiment, the outboard interface is a polygon interface. In this embodiment, the polygon interface may be an 6 to 8-sided polygon surface.

Figure 2:
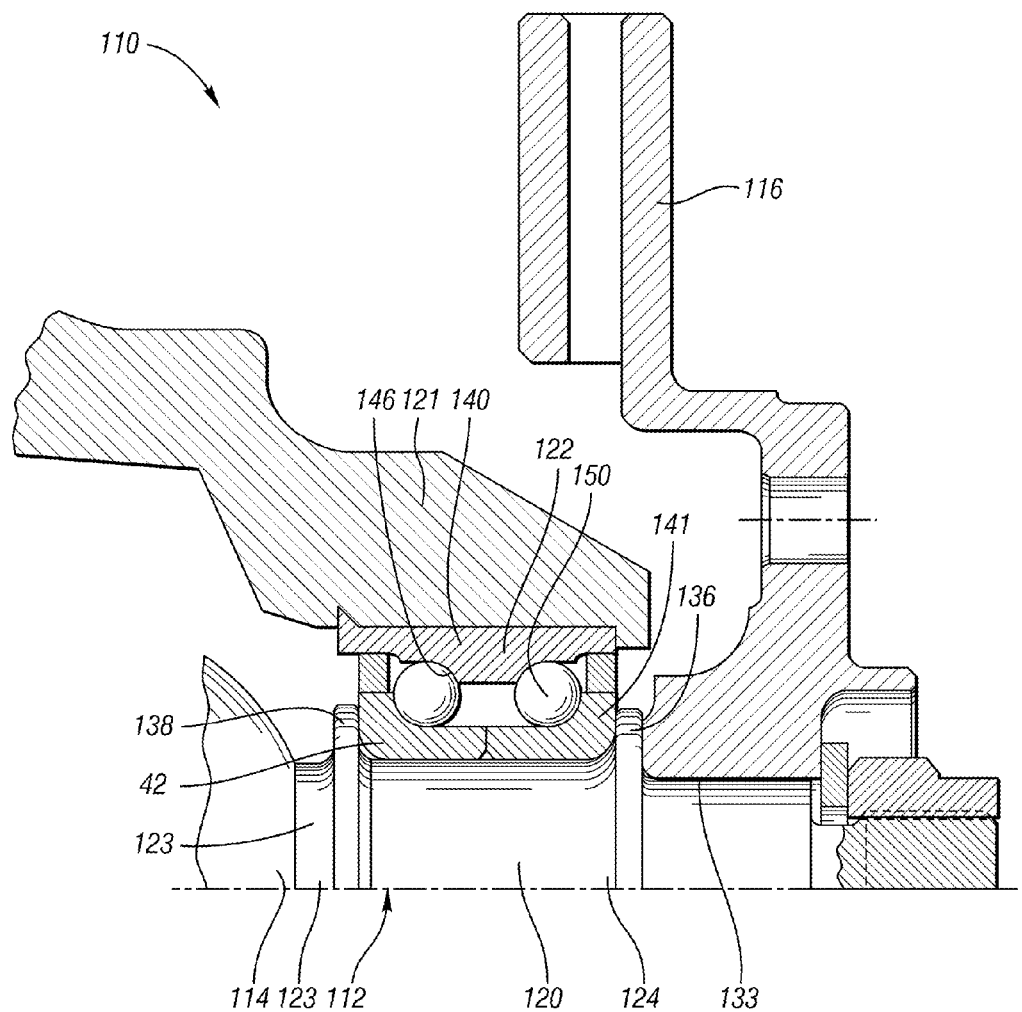
FIG. 2 is a side cross-sectional view of a vehicle wheel end assembly having a detachable half shaft assembly in accordance with another embodiment of the present invention.

FIG. 2 illustrates another embodiment of the vehicle wheel end assembly indicated by reference numeral 110. As shown, the vehicle wheel end assembly 110 includes a detachable half shaft assembly 112, a shaft bell 114 connected to the detachable half shaft assembly 112, and a disc rotor 116 connected to the detachable half shaft assembly 112 opposite the shaft bell 114. The embodiment illustrated in FIG. 2 has similar to components the components depicted in the first embodiment in FIG. 1. For example, the detachable half shaft assembly 12, the shaft bell 14, the disc rotor 16, and the preloaded bearing assembly 22 of FIG. 1 are the same members as the detachable half shaft assembly 112, the shaft bell 114, the disc rotor 116, and the preloaded bearing assembly 122 of FIG. 2, respectively. Moreover, the components of the preloaded bearing assembly 22 attached to knuckle 21 of FIG. 1 are similar to the components of the preloaded bearing assembly 122 attached to knuckle 121. For example, outer race 40, outboard inner race 41, and inboard inner race 42 of preloaded bearing assembly 22 are the same components as outer race 140, outboard inner race 141, and inboard inner race 142 of preloaded bearing assembly 122, respectively.

However, as shown in FIG. 2, the stepped boss 136 of the detachable body 120 is formed at the outboard end 124 thereof. The roll formed face 138 of the detachable body 120 is formed at the inboard end 123 thereof.

The detachable half shaft assembly may be manufactured by any suitable means. For example, the detachable body may be initially rough machined on all surfaces on an apparatus chuck. Except for the area to be roll formed, the detachable body may be hardened by induction or by any other suitable means. Then, the bearing assembly may be disposed about the bearing receiving portion and the detachable body may be roll formed to define the roll formed face, thereby creating a preload on the bearing assembly. Furthermore, the bearing face and outboard polygon may be further machined as desired.

When the vehicle wheel end is to be serviced, the detachable half shaft assembly may be detached from either or both the shaft bell and the disc rotor. This is advantageous and is more time efficient than other wheel end assemblies, since the preload on the bearing assembly is not affected and therefore preload thereon is maintained. As a result, this saves time during the service of the vehicle wheel end and avoids possible service error when being serviced.

It is to be understood that the present invention may be applicable on non-driven wheel ends as well as driven wheel-ends without falling beyond the scope or spirit of the present invention.

Figure 3:
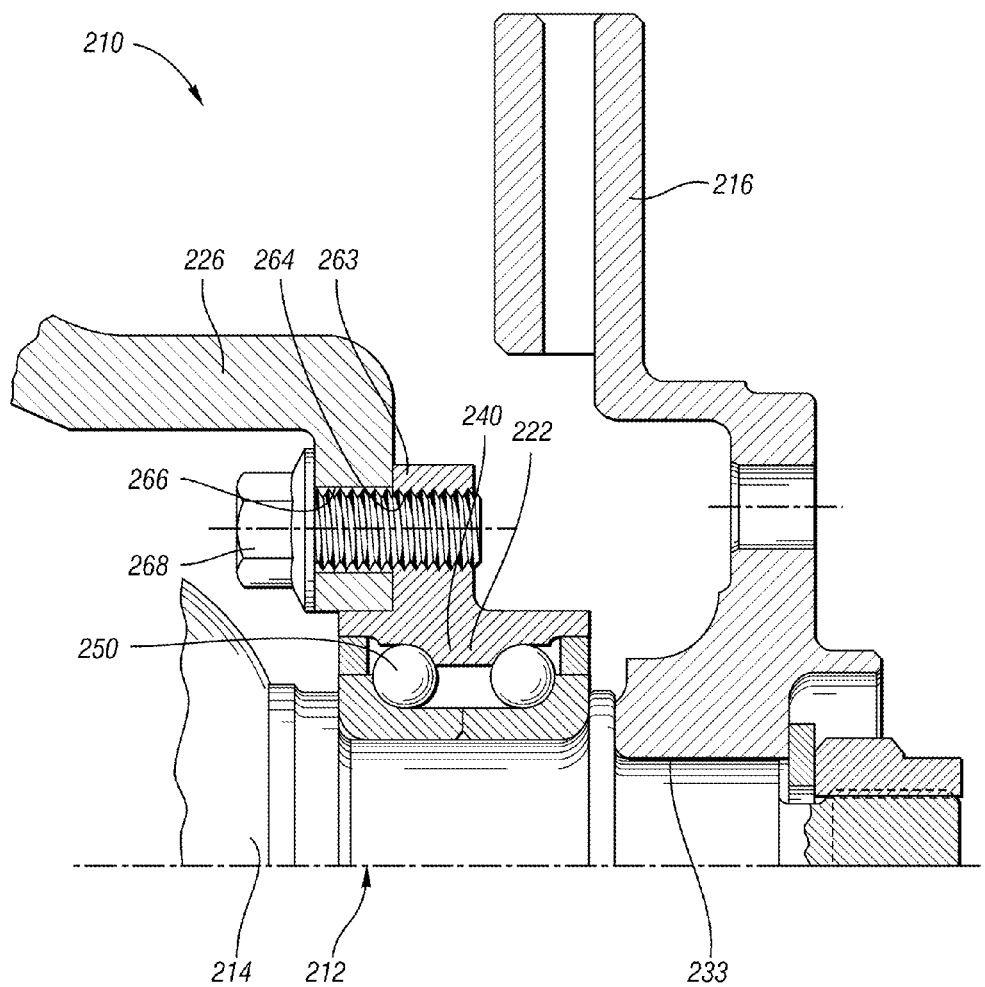
FIG. 3 is a side cross-sectional view of a vehicle wheel end assembly in accordance with yet another embodiment of the present invention.

It is also to be understood that other types or generations of preloaded bearings. For example, FIG. 3 illustrates another embodiment of the vehicle wheel end assembly indicated by reference numeral 210. The embodiment illustrated in FIG. 3 has similar components to the components depicted in the first embodiment in FIG. 1. For example, the detachable half shaft assembly 12, the shaft bell 14, the disc rotor 16, and the preloaded bearing assembly 22 of FIG. 1 are the same members as the detachable half shaft assembly 212, the shaft bell 214, the disc rotor 216, and the preloaded bearing assembly 222 of FIG. 3, respectively. Moreover, the components of the preloaded bearing assembly 22 of FIG. 1 are similar to the components of the preloaded bearing assembly 222. For example, outboard inner race 41 and inboard inner race 42 of preloaded bearing assembly 22 are the same components as outer race 240, outboard inner race 241 and inboard inner race 242 or preloaded bearing assembly 222, respectively.

However, as shown in FIG. 3, the outer race 240 includes a flange 263 extending outwardly and having a first aperture 264. Moreover, knuckle 226 has a second aperture 266 in alignment with first aperture 264 through which a fastener, e.g., a bolt-on fastener 268, is disposed to fasten the assembly 210 to the vehicle. The assembly depicted in FIG. 3 remains preloaded through roll-forming as in the embodiment shown in FIGS. 1 and 2, but also maintains a serviceability advantage through the bolt-on fastener.

While the present invention has been described in terms of preferred embodiments, it will be understood, of course, that the invention is not limited thereto since modifications may be made to those skilled in the art, particularly in light of the foregoing teachings.

It is also to be understood that other types or generations of preloaded bearings. For example, FIG. 3 illustrates another embodiment of the vehicle wheel end assembly indicated by reference numeral 210. The embodiment illustrated in FIG. 3 has similar components to the components depicted in the first embodiment in FIG. 1. For example, the detachable half shaft assembly 12, the shaft bell 14, the disc rotor 16, and the preloaded bearing assembly 22 of FIG. 1 are the same members as the detachable half shaft assembly 212, the shaft bell 214, the disc rotor 216, and the preloaded bearing assembly 222 of FIG. 3, respectively. Moreover, the components of the preloaded bearing assembly 22 of FIG. 1 are similar to the components of the preloaded bearing assembly 222. For example, outboard inner race 41 and inboard inner race 42 of preloaded bearing assembly 22 are the same components as outer race 240, outboard inner race 241 and inboard inner race 242 or preloaded bearing assembly 222, respectively.

We claim:

1. A detachable half shaft assembly of a vehicle wheel end having a shaft bell and a disc rotor, the detachable half shaft assembly comprising:
 a detachable shaft having an inboard interface at an inboard end and an outboard interface at an outboard end, the inboard interface for connecting to the shaft bell and the outboard interface for connecting to the disc rotor, the detachable shaft having a bearing receiving portion defined by a stepped boss and a roll formed face; and
 a preloaded bearing assembly preloaded and maintained about the detachable shaft, the preloaded bearing assembly comprising:
  an outer race including an inner wall formed therethrough having an inboard outer raceway and an outboard outer raceway formed thereon;
  an outboard inner race disposed adjacent the outboard end of the detachable shaft, the outboard inner race having a first raceway formed thereon and configured to cooperate with the outboard outer raceway of the outer race to house bearings, the outboard inner race having an outboard inner surface; and
  an inboard inner race disposed adjacent the inboard end of the detachable shaft, the inboard inner race having a second raceway formed thereon and configured to cooperate with the inboard outer raceway of the outer race to house bearings, the inboard inner race having an inboard inner surface,
 the bearing receiving portion radially receiving inboard and outboard inner surfaces, the stepped boss and the roll formed face engaging the bearing assembly to maintain the preload on the detachable shaft when the detachable half shaft assembly is detached from the shaft bell or the disc rotor.

2. The detachable half shaft assembly of claim 1, wherein the stepped boss of the detachable shaft is formed at one of the inboard end and the outboard end.

3. The detachable half shaft assembly of claim 2, wherein the roll formed face is formed adjacent the other of the inboard end and the outboard end.

* * * * *